United States Patent
Tsaprev et al.

(10) Patent No.: US 9,524,455 B2
(45) Date of Patent: Dec. 20, 2016

(54) PROTECTIVE STRIPE FOR BANK CARDS

(71) Applicant: SKIMPROT, Limited Liability Company, Sofia (BG)

(72) Inventors: Nikolay Marinov Tsaprev, Sofia (BG); Dimitar Ivanov Chobanov, Sofia (BG)

(73) Assignee: SKIMPORT, Sofia (BG)

( * ) Notice: Subject to any disclaimer, the term of this patent is extended or adjusted under 35 U.S.C. 154(b) by 0 days.

(21) Appl. No.: 14/891,239

(22) PCT Filed: Dec. 18, 2013

(86) PCT No.: PCT/BG2013/000055
§ 371 (c)(1),
(2) Date: Nov. 13, 2015

(87) PCT Pub. No.: WO2014/183174
PCT Pub. Date: Nov. 20, 2014

(65) Prior Publication Data
US 2016/0092761 A1    Mar. 31, 2016

(30) Foreign Application Priority Data
May 13, 2013    (BG) .......................................... 111466

(51) Int. Cl.
*G06K 19/02*    (2006.01)
*G06K 19/06*    (2006.01)
*G07F 7/08*    (2006.01)

(52) U.S. Cl.
CPC ... *G06K 19/06187* (2013.01); *G06K 19/06196* (2013.01); *G07F 7/086* (2013.01); *G07F 7/0813* (2013.01); *G07F 7/0866* (2013.01)

(58) Field of Classification Search
CPC .................. G06K 19/06187; G06K 19/06196; G07F 7/0813; G07F 7/086; G07F 7/0866
USPC ......................................... 235/379, 488, 492
See application file for complete search history.

(56) References Cited

U.S. PATENT DOCUMENTS 6,068,301 A * 5/2000 Han ........................ G06K 17/00
                                                            235/379
2006/0243791 A1* 11/2006 McGee ............ G06K 19/06187
                                                            235/380

* cited by examiner

*Primary Examiner* — Seung Lee
(74) *Attorney, Agent, or Firm* — Inventa Capital PLC

(57) ABSTRACT

A protective stripe for a bank card includes several layers interconnected with one another, as the first of the layers is an adhesive layer, a protective stripe is fixed to the bank card, a second layer is protective and bearing layer made of at least one of paper, plastic and foil, and a third layer is the carrier of ex officio information necessary for the operation of ATMs.

2 Claims, 2 Drawing Sheets

PROTECTIVE STRIPE FOR BANK CARDS

SCOPE OF APPLICATION

The invention relates to a protective stripe for bank cards, such as credit, debit and other suchlike, with a magnetic stripe and a chip. The invention will find application mostly in the field of banking as a means to prevent bank robberies of clients of banks and other financial institutions.

BACKGROUND OF THE STATE OF TECHNOLOGY

The present invention The entry of debit and credit cards has increased the volume of transactions and types of payment made via such cards. This has aroused the interest of criminals and gradually criminal practices of stealing money from accounts served by credit and debit cards have been introduced. The cards contain, in electronic and graphic form, data about the card (number, expiration date and others) and about the cardholder (name). When a card is inserted into a device for cashless payment, the balance available at the account to which the card is attached and the status of the card itself are checked at the authorization center. The data on the card are recorded on a magnetic stripe (the dark right-hand part on the reverse of the card) and are doubled into a memory chip (the glittering brass contact pad) and by means of embossed numbers and letters on the obverse of the card. On the reverse of the card there is a signature field and a numerical security code used for Internet payments. The card always comes with a PIN code being a four-digit number that is known by the cardholder. This code is entered manually via a keypad and is a part of the procedure to carry out transactions.

In order to carry out a cashless payment by means of a card, those data need to get electronically to the authorization center where the card is identified and the transaction is authorized. In order to carry out an Internet payment it is sufficient to know the card's number, expiration date, cardholder's name and numerical security code. The data contained in the card are the ones criminals aim at. If they have those data in electronic or other form they can make payments and withdraw money on cardholder's behalf anywhere in the world until the account is emptied or blocked. The amount of money so withdrawn and illicit transactions for Europe exceeds EUR 300 billion. Data theft from credit and debit cards is known as skimming. The skimming technique is as follows: When the card is inserted into a device for cashless payment, by means of a special device (skimmer) placed inside in advance before the card gets to the reader of the cash machine (ATM) the card data are recorded or transmitted via a radio channel by the skimmer.

Subsequently, a duplicate of the skimmed credit card is made based on those data. Those data are not sufficient to carry out a transaction. A PIN code is also necessary. Two methods are mainly employed to obtain the PIN code: either to film the PIN code while it is being entered on the keypad, or to place a false keypad with a key logger, i.e. a keypad that records the entered key combinations via its keys and transmits them to the criminals. The main method employed is video camera recording. Numerous miniature and cheap video cameras enabling autonomous and high-resolution recording are currently available at the market, including the cameras embedded in GSM mobile devices. A skimmer can also be placed in a trade outlet, at the place where payments are made at the cash desk but usually the fraud happens with the participation of the staff and users cannot detect or avoid it. In order to obtain card data it suffices to have both sides of it filmed by a photo camera or a mega-pixel video camera. To do so two cameras are mounted next to the place where payments are made: one above and one underneath the cash desk work surface so that both sides of the card can be filmed in high resolution while the user hands it over to make a payment. With the information so obtained criminals just start shopping on the Internet on behalf of the user. Data stored in the card chip are, however, in a relatively safe place. To date, there are no known data that a card chip has been successfully read (skimmed).

On the other hand, credit and debit cards are intended to be used to make cashless payments all over the world. Currently, there are 1.62 billion cards with chip in circulation worldwide, i.e. 45% of all existing debit and credit cards. There are 24 million ATMs equipped with chip readers or 76% of all ATMs worldwide. These statistics show that not all ATMs worldwide are equipped with chip readers to avoid skimming devices for cards' magnetic stripes. In many countries, e.g. in North America: USA and Canada a great part of ATMs are not equipped with chip readers. In these countries the banks are not interested in carrying out skimming protection actions. It has been calculated that in the USA the total sum of the losses for the system due to skimming is about 10 times less than the sum necessary to re-equip the terminals with safer technical means. Banks' money is insured against such type of encroachments and the banks recover their damages out of the insurances. Actually, the adverse effects are felt mainly by the user. The user can do much for the safety of his/her card. To enhance the security of data in the bank card it should not be given to strangers; no information about card number should be made available; when the PIN code is entered the keypad should be covered by the other hand; if possible, night-time cash withdrawals from unlit ATMs as well as withdrawals from ATMs displaying apparent irregularities should be avoided and other instructions that are made available when the card is issued. It is recommended to use credit and debit cards with a chip. Cards with a chip have higher level of protection. The fact that the information recorded on the chip is also available on the magnetic stripe is a problem. This is done so as to enable transactions all over the world. In many countries, including, however, the USA, most ATMs and other similar devices do not operate with cards with chips. Therefore, if a card with a chip is available, it is recommended to avoid the use of devices having a reader for magnetic cards.

This can not be avoided in ATMs but can be in stores. Devices used on the stores, the so-called "point of sale" terminals have a smaller slit in which the narrow side of the card is inserted for about ⅓ of its length. Apparently, these measures are initially difficult to implement and the implementation thereof can seem strange or paranoid. It is clear that an untrained individual will hardly find a skimming device or any signs that one has been placed. (1) On the other hand, no technical means are known that are sufficiently reliable to protect one against skimming.

SUMMARY OF THE INVENTION

The task of this invention is to create a protective stripe for bank cards that covers the actual personal financial information recorded on each card's magnetic stripe so that one's personal information can be extracted only from the card's chip and thus to ensure protection against skimming for data on the card.

This task is accomplished by means of a protective stripe which, according to the invention, comprises several interconnected layers made of different materials and placed one above the other.

The first, lowermost layer is an adhesive layer and is most commonly glue by which the protective stripe is fixed to the debit or credit card and covers the standard magnetic stripe of the card.

The next layer is one made of paper but it can also be made of plastic or foil. It is intended mostly to protect the standard magnetic stripe of the card so that that personal data therein recorded can not be read and also to bear all other layers.

The third layer is the one that carries ex officio information without financial data, which is necessary for the operation of ATMs. The third layer can also carry misleading personal information about the cardholder. Most often this is a magnetic stripe but could also be dye or ink having the magnetic properties of a "carrier" of the necessary and misleading information.

After the information carrier layer follows a protective layer or protective coating made by foil or varnish or other material appropriate to that end.

The protective stripe is placed on the part where the standard magnetic stripe of the card is and covers the personal financial information recorded on the standard magnetic stripe.

In an various embodiment of the invention the bank card is placed into a slip-in case made of foil, paper, plastic or other material as openings are made on the slip-in case for the chip and the protective stripe is fixed on the place covering the standard magnetic stripe.

The proposed protective stripe as well as the slip-in case can be repeatedly removed from and placed on the debit or credit card but it is recommended not to reuse the protective magnetic stripe.

The invention's advantages are the simplicity of the solution ensuring a high level of security of bank cards at minimum additional costs. Moreover, the cards' integrity is not violated in any way whatsoever and the information recorded on the cards is not affected or changed.

This invention resolves a long-standing problem in society, namely: to ensure personal protection of debit and credit cards against encroachments by thieves.

If it is necessary to use the card in an ATM or a point of sale terminal without a reader for debit or credit cards the protective stripe can be removed and the card can be used without the protection offered but this can only be done if the cardholder decides so.

DESCRIPTION OF THE DRAWINGS

An illustration of this invention is given in the attached figures where.

DETAILED DESCRIPTION OF THE INVENTION

Figure 1:
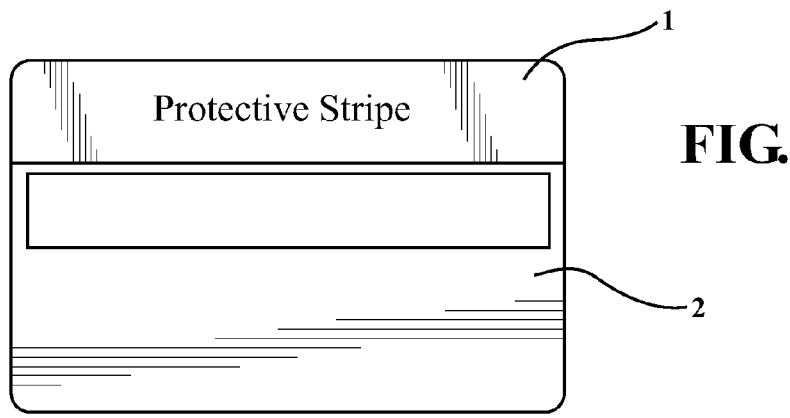
FIG. 1 represents a debit or a credit card with a protective stripe fixed on it.

As illustrated on FIG. 1, a protective stripe 1 for debit and credit cards 2 comprises several interconnected layers made of different materials and placed one above the other. The first, lowermost layer 3, as shown on FIG. 2, is an adhesive layer and is most commonly glue by which the protective stripe 1 is fixed to the debit or credit card 2 and covers the standard magnetic stripe 7, as shown on FIG. 3, of the card 2.

Figure 2:
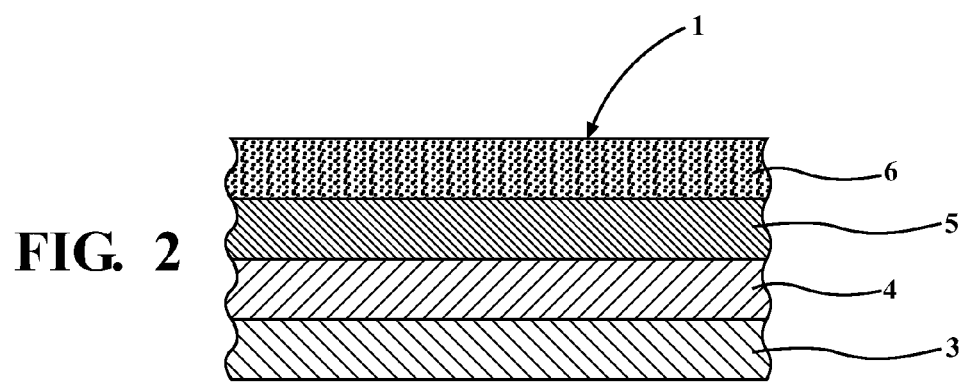
FIG. 2 represents a cross section of a protective stripe.

The next layer is one 4, as shown on FIG. 2, is made of paper but it can also be made of plastic or foil. It is intended mostly to protect the standard magnetic stripe 7 of the card 2 so that that personal data therein recorded can not be read and also to bear all other layers.

The third layer 5 is the one that carries ex officio information without financial data, which is needed for the operation of ATMs. The third layer 5 can also carry misleading personal information about the holder of the card 2. Most often this is a magnetic stripe but could also be dye or ink having the magnetic properties of a "carrier" of the necessary and misleading information. The magnetic layer (magnetic stripe) is laid on the bearing layer 4 by hot stamping.

After the information carrier layer 5 follows a protective layer 6 or protective coating made by foil or varnish or other material appropriate to that end. This layer 6 serves to protect the element from physical or other impact. If varnish is used the protective layer 6 is laid on the protective stripe 1 by flexo.

Figure 3:
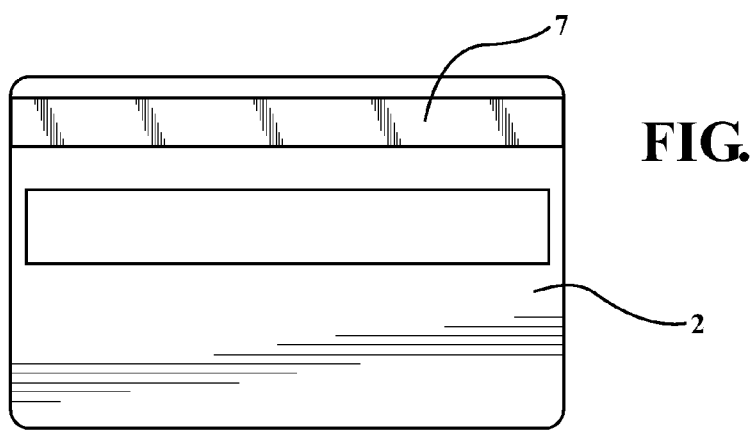
FIG. 3 represents an image of the reverse of a standard debit or credit card.
Figure 4:
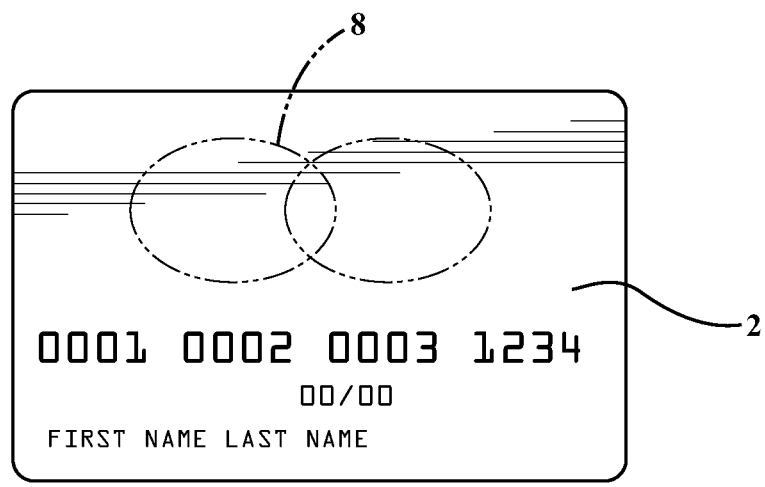
FIG. 4 represents an image of the obverse of a standard debit or credit card.

As aforesaid, a standard magnetic stripe 7 and, in some cases, a chip 8 as shown on FIGS. 3 and 4, are fixed on the standard debit and credit cards 2. The proposed protective stripe 1 is placed on the part where the standard magnetic stripe 7 of the card 2 is and covers the personal financial information recorded on the standard magnetic stripe 7.

If it is necessary to use the card 2 in an ATM or point of sale terminals without a reader for debit or credit cards 2 the protective stripe 1 can be removed and the card 2 can be used without the protection offered but this can only be done if the holder of the card 2 decides so.

For user's convenience, in an various embodiment of the invention (not shown on attached figures) the debit or credit card 2 is placed into a slip-in case made of foil, paper, plastic or other material as openings are made on the slip-in case for the chip 8 and the protective stripe 1 is fixed on the place covering the standard magnetic stripe 7.

When the card 2 with the protective stripe 1 is inserted into the ATM, the data recorded on the protective stripe 1 are extracted first. These data, however, are not sufficient to effect a transaction and then data are extracted from the chip 8 of the card 2 via a chip reader. The data from the chip 8, however, can not be skimmed, which ensures the security of the card 2.

Figure 5:
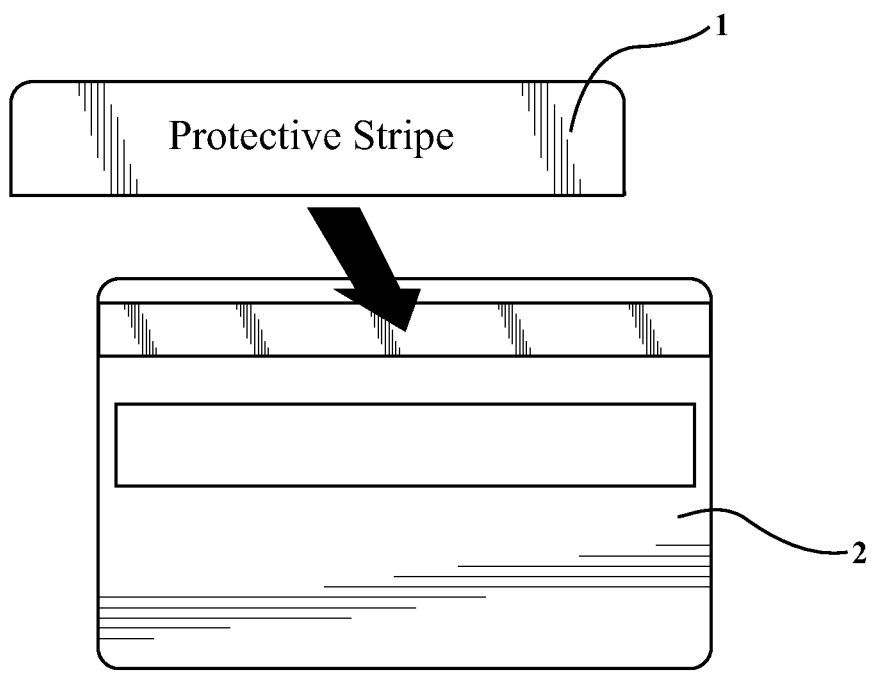
FIG. 5 represents a debit card in the process of placing the protective stripe.

The protective stripe 1 can be non-reusable or reusable. The proposed protective stripe 1 can be repeatedly removed from and placed on the debit or credit card 2 but it is recommended not to reuse the protective magnetic stripe as shown on FIG. 5.

If it is necessary to use the card 2 in an ATM or point of sale terminals without a reader for debit or credit cards 2 the protective stripe 1 can be removed and the card 2 can be used without the protection offered but this can only be done if the holder of the card 2 decides so. The removed protective stripe 1 does not leave any traces on the card 2.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A protective stripe for a bank card comprising;
several layers interconnected with one another, as the first of the layers, is an adhesive layer and is glued by which a protective stripe is fixed to the bank card,
a second layer is protective and bearing layer made of at least one of paper, plastic and foil,
a third layer is the carrier of first information necessary for the operation of ATMs excluding such personal that includes financial data, the third layer also is a carrier of information about the holder of the bank card, the carrier is at least one of a magnetic stripe, a dye and an ink having the magnetic properties of a "carrier" of information, and
a fourth layer is a protective layer made by foil or varnish as the protective stripe is placed on the part where a standard magnetic stripe of the bank card is and covers the personal financial information recorded on the standard magnetic stripe.
2. The protective stripe, as claimed in claim 1, wherein the bank card is placed into a slip-in case made of at least one of foil, paper, plastic as openings with dimensions corresponding to the dimensions of a chip are made on the slip-in case and the protective stripe is fixed on the place covering the standard magnetic stripe.

* * * * *